(12) United States Patent
Sakhnini et al.

(10) Patent No.: US 12,323,215 B2
(45) Date of Patent: Jun. 3, 2025

(54) MIXED UPLINK REFERENCE SIGNAL BEAM MANAGEMENT

(71) Applicant: QUALCOMM Incorporated, San Diego, CA (US)

(72) Inventors: Iyab Issam Sakhnini, San Diego, CA (US); Tao Luo, San Diego, CA (US); Yan Zhou, San Diego, CA (US); Jelena Damnjanovic, Del Mar, CA (US); Wooseok Nam, San Diego, CA (US); Mahmoud Taherzadeh Boroujeni, San Diego, CA (US); Juan Montojo, San Diego, CA (US); Peter Gaal, San Diego, CA (US); Peter Pui Lok Ang, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 17/184,291

(22) Filed: Feb. 24, 2021

(65) Prior Publication Data

US 2021/0306051 A1 Sep. 30, 2021

Related U.S. Application Data

(60) Provisional application No. 62/994,042, filed on Mar. 24, 2020.

(51) Int. Cl.
*H04B 7/06* (2006.01)
*H04L 5/00* (2006.01)
(Continued)

(52) U.S. Cl.
CPC ......... *H04B 7/0695* (2013.01); *H04B 7/0617* (2013.01); *H04L 5/0048* (2013.01);
(Continued)

(58) Field of Classification Search
CPC .. H04B 7/0695; H04B 7/0617; H04B 7/0404; H04L 5/0048; H04L 25/0226;
(Continued)

(56) References Cited

U.S. PATENT DOCUMENTS

| | | |
|---|---|---|
| 2020/0204314 A1 | 6/2020 | Kang et al. |
| 2022/0132430 A1* | 4/2022 | Hoshino ............... H04L 5/0051 |
| 2023/0076139 A1* | 3/2023 | Muruganathan ...... H04L 5/0048 |

FOREIGN PATENT DOCUMENTS

| | | |
|---|---|---|
| EP | 3301846 A1 | 4/2018 |
| WO | WO-2018128376 A1 | 7/2018 |

(Continued)

OTHER PUBLICATIONS

International Search Report and Written Opinion—PCT/US2021/019694—ISA/EPO—Jun. 14, 2021.

*Primary Examiner* — Eric Myers
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a beam management configuration that indicates a set of resources to be used by the UE for transmitting a plurality of reference signals, including at least one sounding reference signal (SRS) and at least one demodulation reference signal (DMRS), to be used for beam refinement during an uplink beam management occasion; and transmit, to the base station, the at least one SRS and the at least one DMRS based at least in part on the beam management configuration. Numerous other aspects are provided.

30 Claims, 5 Drawing Sheets

(51) Int. Cl.
  *H04L 25/02* (2006.01)
  *H04W 72/044* (2023.01)
  *H04W 72/23* (2023.01)
  *H04W 72/53* (2023.01)
(52) U.S. Cl.
  CPC ....... *H04L 25/0226* (2013.01); *H04W 72/046* (2013.01); *H04W 72/23* (2023.01); *H04W 72/53* (2023.01)
(58) Field of Classification Search
  CPC ... H04L 5/0051; H04L 5/0023; H04L 5/0094; H04W 72/042; H04W 72/046; H04W 72/0493; H04W 72/14
  See application file for complete search history.

(56) References Cited

FOREIGN PATENT DOCUMENTS

| WO | WO-2018174312 A1 | 9/2018 |
| WO | WO-2019017755 A1 | 1/2019 |

* cited by examiner

MIXED UPLINK REFERENCE SIGNAL BEAM MANAGEMENT

CROSS-REFERENCE TO RELATED APPLICATION

This patent application claims priority to U.S. Provisional Patent Application No. 62/994,042, filed on Mar. 24, 2020, entitled "MIXED UPLINK REFERENCE SIGNAL BEAM MANAGEMENT," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for mixed uplink reference signal beam management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include receiving, from a base station, a beam management configuration that indicates a set of resources to be used by the UE for transmitting a plurality of reference signals, including at least one sounding reference signal (SRS) and at least one demodulation reference signal (DMRS), to be used for beam refinement during an uplink beam management occasion; and transmitting, to the base station, the at least one SRS and the at least one DMRS based at least in part on the beam management configuration.

In some aspects, a method of wireless communication, performed by a base station, may include transmitting, to a UE, a beam management configuration that indicates a set of resources to be used by the UE for transmitting at least one SRS and at least one DMRS to be used for beam refinement during an uplink beam management occasion; and receiving, from the UE, the at least one SRS and the at least one DMRS based at least in part on the beam management configuration.

In some aspects, a UE for wireless communication may include a memory and one or more processors operatively coupled to the memory. The memory and the one or more processors may be configured to receive, from a base station, a beam management configuration that indicates a set of resources to be used by the UE for transmitting a plurality of reference signals, including at least one SRS and at least one DMRS, to be used for beam refinement during an uplink beam management occasion; and transmit, to the base station, the at least one SRS and the at least one DMRS based at least in part on the beam management configuration.

In some aspects, a base station for wireless communication may include a memory and one or more processors operatively coupled to the memory. The memory and the one or more processors may be configured to transmit, to a UE, a beam management configuration that indicates a set of resources to be used by the UE for transmitting at least one SRS and at least one DMRS to be used for beam refinement during an uplink beam management occasion; and receive, from the UE, the at least one SRS and the at least one DMRS based at least in part on the beam management configuration.

In some aspects, a non-transitory computer-readable medium may store one or more instructions for wireless communication. The one or more instructions, when executed by one or more processors of a UE, may cause the one or more processors to receive, from a base station, a beam management configuration that indicates a set of resources to be used by the UE for transmitting a plurality of reference signals, including at least one SRS and at least one DMRS, to be used for beam refinement during an uplink beam management occasion; and transmit, to the base station, the at least one SRS and the at least one DMRS based at least in part on the beam management configuration.

In some aspects, a non-transitory computer-readable medium may store one or more instructions for wireless communication. The one or more instructions, when executed by one or more processors of a base station, may cause the one or more processors to transmit, to a UE, a beam management configuration that indicates a set of resources to be used by the UE for transmitting at least one SRS and at least one DMRS to be used for beam refinement during an uplink beam management occasion; and receive, from the UE, the at least one SRS and the at least one DMRS based at least in part on the beam management configuration.

In some aspects, an apparatus for wireless communication may include means for receiving, from a base station, a beam management configuration that indicates a set of resources to be used by the apparatus for transmitting a plurality of reference signals, including at least one SRS and at least one DMRS, to be used for beam refinement during an uplink beam management occasion; and means for transmitting, to the base station, the at least one SRS and the at least one DMRS based at least in part on the beam management configuration.

In some aspects, an apparatus for wireless communication may include means for transmitting, to a UE, a beam management configuration that indicates a set of resources to be used by the UE for transmitting at least one SRS and at least one DMRS to be used for beam refinement during an uplink beam management occasion; and means for receiving, from the UE, the at least one SRS and the at least one DMRS based at least in part on the beam management configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
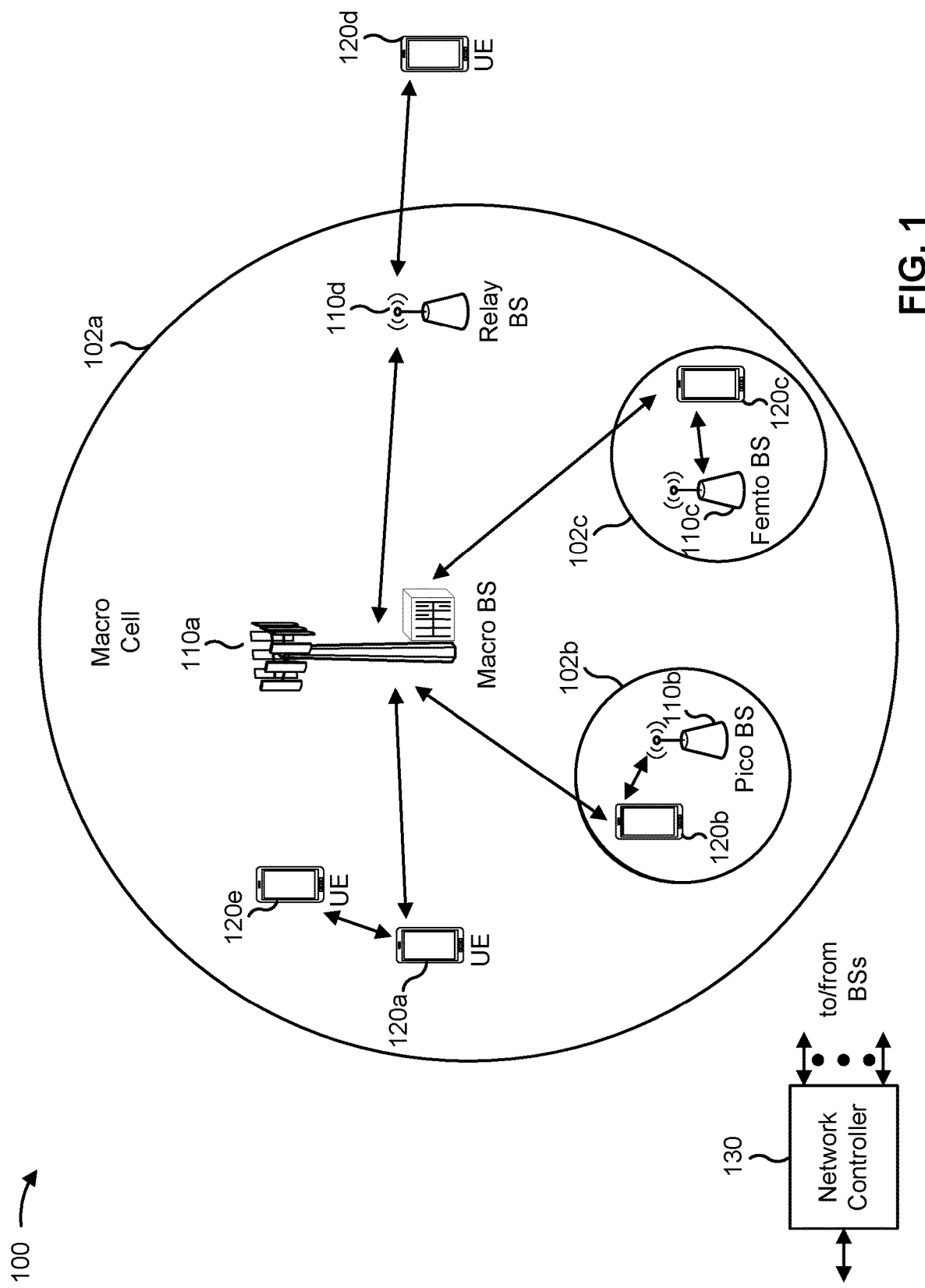
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which May span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
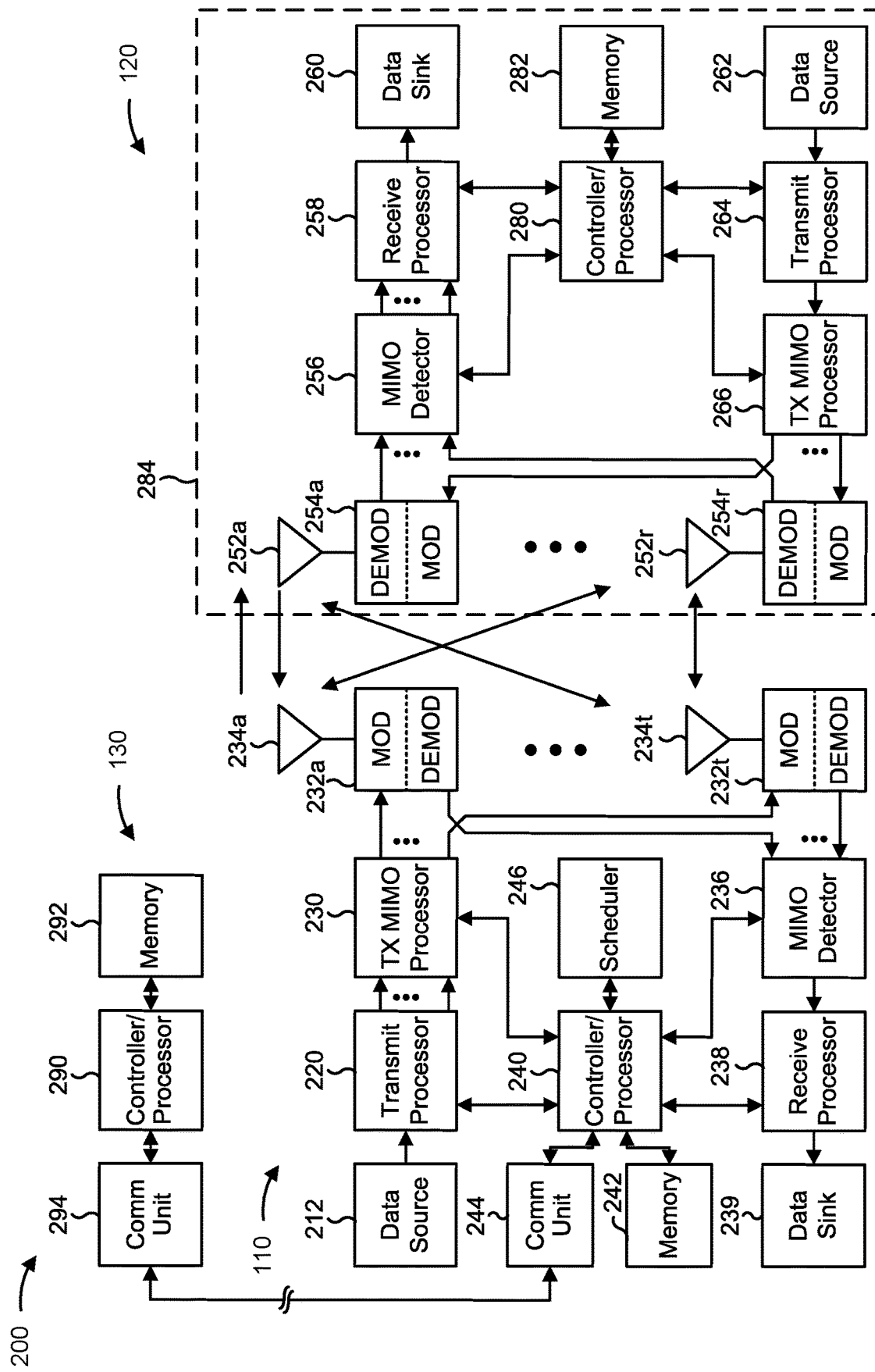
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-5.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-5.

Controller/processor 240 of base station 110, controller/processor 280 of UE 120, and/or any other component(s) of FIG. 2 may perform one or more techniques associated with mixed uplink reference signal beam management, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, and/or other processes as described herein. In some aspects, executing instructions may include running the instructions, converting the instructions, compiling the instructions, and/or interpreting the instructions, among other examples.

In some aspects, UE 120 may include means for receiving, from a base station, a beam management configuration that indicates a set of resources to be used by the UE for transmitting a plurality of reference signals, including at least one sounding reference signal (SRS) and at least one DMRS, to be used for beam refinement during an uplink beam management occasion, means for transmitting, to the base station, the at least one SRS and the at least one DMRS based at least in part on the beam management configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, a beam management configuration that indicates a set of resources to be used by the UE for transmitting at least one SRS and at least one DMRS to be used for beam refinement during an uplink beam management occasion, means for receiving, from the UE, the at least one SRS and the at least one DMRS based at least in part on the beam management configuration, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

As described above in connection with FIG. 1, a base station may serve different UEs of different categories, different UEs that support different capabilities, and/or the like. For example, the base station may serve a first category of UEs that have a less advanced capability (e.g., a low tier UE, a lower capability UE, a reduced capability UE, an NR-Lite UE, and/or the like) and a second category of UEs that have a more advanced capability (e.g., a higher capability UE, a high tier UE, a premium UE, an NR UE, a legacy UE, and/or the like). In this case, UEs of the first category may have a reduced feature set compared to UEs of the second category.

For example, UEs of the first category may support a lower maximum MCS than UEs of the second category (e.g., quadrature phase shift keying (QPSK) or the like as compared to 256-quadrature amplitude modulation (QAM) or the like), may support a lower transmit power than UEs of the second category, may have a less advanced beamforming capability than UEs of the second category, may be incapable of communicating on as wide of a maximum bandwidth part as UEs of the second category, may have fewer antennas (e.g., transmit antennas and/or receive antennas) and/or antenna ports than UEs of the second category, may be incapable of full duplex communication, may have a lower power class than UEs of the second category, may have a reduced bandwidth capacity, and/or the like. Accordingly, one consideration in deploying a wireless network is to compensate for different UE capabilities. For example, a base station that serves UEs having different capabilities may implement functionality to mitigate or limit performance degradation (e.g., potential coverage reduction) that may result from a UE having a reduced complexity.

Beam management typically is performed using repeated SRS resources, which may be resource-intensive, particularly in view of the limited resources that may be available for a UE that has a reduced bandwidth capacity as compared to other devices. Some solutions facilitate uplink beam management using DMRS. DMRS-based beam management may be useful in reducing the need for configuring multiple and/or frequent SRS resource sets, since DMRS is already available. However, DMRS-based beam management typically includes repetition of the DMRS resources up to two repetitions. Two DMRSs may be used for beam management for two beams, but may not be sufficient for management of more than two beams (e.g., four beams, and/or the like).

Some aspects described herein relate to techniques and apparatuses for using mixed uplink reference signals for beam management. In some aspects, at least one SRS and at least one DMRS are used for beam management. Using SRS and DMRS may facilitate reducing the number of SRS resources needed for beam management, increasing the number of possible beams that can be swept without configuring as many SRS resources, and/or the like. In some aspects, a base station may transmit a beam management configuration to a UE that indicates a set of resources to be used by the UE for transmitting a combination of SRS and DMRS resources for beam management. In some aspects, the SRS(s) and DMRS(s) may be transmitted using different beams. In this way, aspects may facilitate refinement of the UE's uplink beam resources. In some aspects, the base station may request that the UE transmit all of the SRS and DMRS resources on a single beam. In this way, aspects may facilitate refinement of the base station's beam resources.

Figure 3:
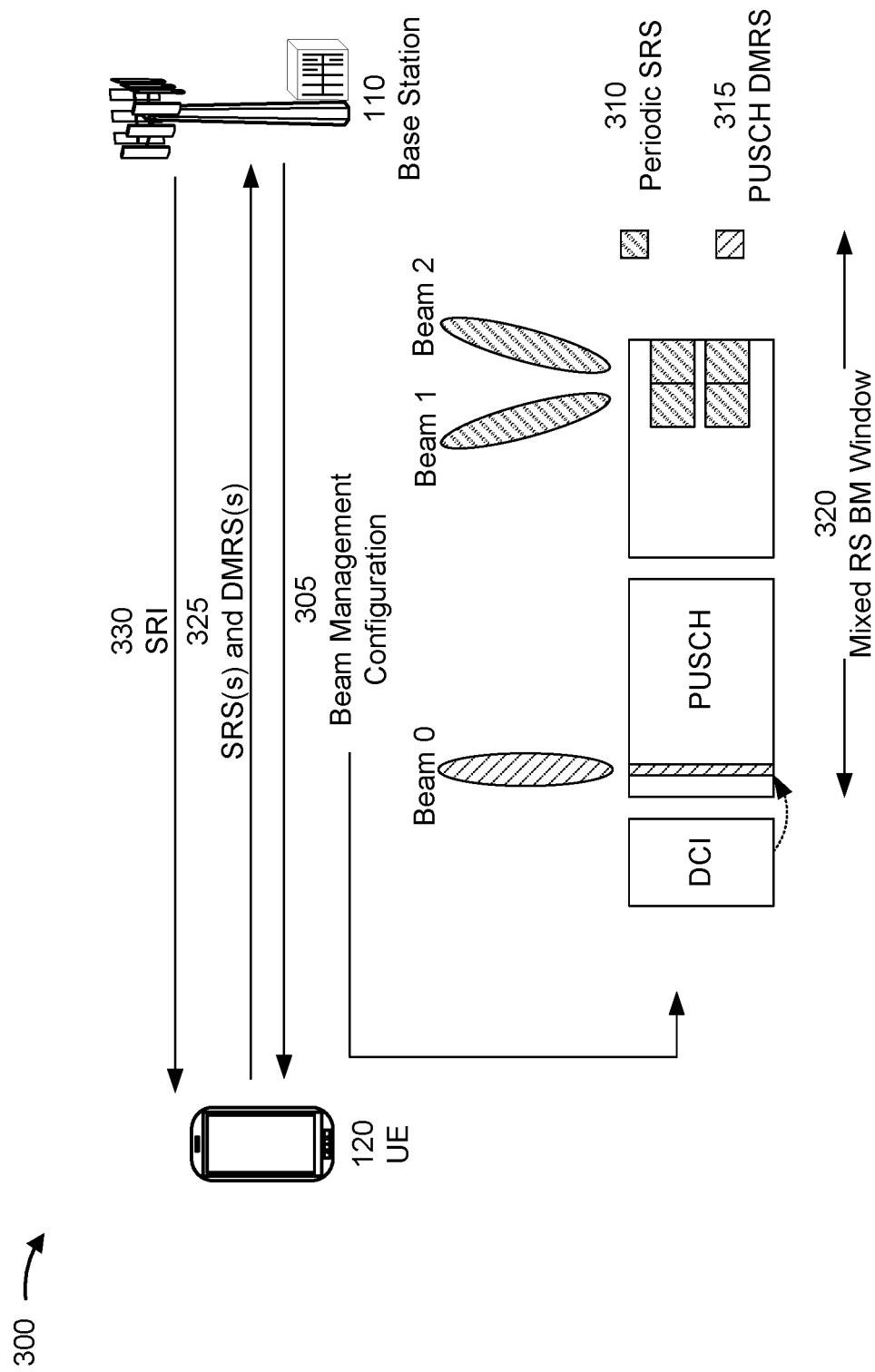
FIG. 3 is a diagram illustrating an example of mixed uplink reference signal beam management, in accordance with the present disclosure.

FIG. 3 is a diagram illustrating an example 300 of mixed uplink reference signal beam management, in accordance with the present disclosure. As shown, a UE 120 and a base station 110 may communicate with one another.

As shown by reference number 305, the base station 110 may transmit, and the UE 120 may receive, a beam management configuration that indicates a set of resources to be used by the UE 120 for transmitting a plurality of reference signals. The plurality of reference signals may include at least one SRS and at least one DMRS, to be used for beam refinement during an uplink beam management occasion.

In some aspects, the beam management configuration may be carried in a radio resource control (RRC) message, downlink control information (DCI), and/or the like. As shown by reference number 310, the set of resources may include a set of periodic SRS resources. In some aspects, the set of resources may include a set of semi-persistent SRS resources, a set of aperiodic SRS resources, and/or the like. As shown by reference number 315, the set of resources may include a set of DMRS resources corresponding to one or more physical uplink shared channel (PUSCH) grants. In some aspects, the beam management configuration may include DCI that includes an explicit indication of at least one SRS, at least one DMRS, and/or the like. In some aspects, the set of resources may include a set of DMRS resources corresponding to a physical uplink control channel (PUCCH), a set of DMRS resources corresponding to a configured grant (CG) configuration, and/or the like.

As shown by reference number 320, the set of resources may include a set of time-domain resources indicating a window corresponding to the uplink beam management (BM) occasion within which the mixed reference signal (RS) transmissions occur (shown as "MIXED RS BM WINDOW"). As shown, the window may be associated with a time period to begin before a resource grant. In some aspects, the window may be associated with a time period to begin after a resource grant, before a CG occasion, after a CG occasion, before a PUCCH transmission, after a PUCCH transmission, before a DCI trigger, after a DCI trigger, and/or the like.

As shown by reference number 325, the UE 120 may transmit, and the base station 110 may receive, the at least one SRS and the at least one DMRS based at least in part on the beam management configuration. In some aspects, the base station 110 may transmit, and the UE 120 may receive, a beam management trigger indication. The at least one SRS and the at least one DMRS may be transmitted for beam management based at least in part on receiving the beam management trigger indication. In some aspects, the beam management trigger indication may be carried in an RRC message or DCI.

As shown, the at least one DMRS may be transmitted on a PUSCH, a PUCCH, and/or the like. In some aspects, the at least one DMRS may include a plurality of DMRSs. In some aspects, the plurality of DMRSs may be based at least in part on a repeated uplink transmission, a plurality of uplink resource grants, and/or the like. In some aspects, the plurality of reference signals may be transmitted using a plurality of beams, and the UE 120 may use the at least one SRS and the at least one DMRS to facilitate refinement of one or more transmitting beams associated with the UE 120.

As shown by reference number 330, the base station 110 may transmit, and the UE 120 may receive, an SRS resource indicator (SRI) configuration corresponding to an SRI. In some aspects, the SRI may include at least one identifier associated with the at least one DMRS. In some aspects, the SRI configuration may be carried in an RRC message, a DCI, and/or the like. In some aspects, the SRI may indicate a selected beam that is selected by the base station based at least in part on a signal quality associated with the selected beam. In some aspects, the SRI may indicate the selected beam using the at least one index associated with the at least one DMRS.

According to various aspects, the at least one SRS and the at least one DMRS may be transmitted using a single beam to permit the base station 110 to facilitate refinement of one or more receiving beams associated with the base station 110. In some aspects, the base station 110 may transmit, and the UE 120 may receive, a request for the UE 120 to transmit the at least one SRS and the at least one DMRS using a single beam. In some aspects, the request may be carried in DCI. In some aspects, the beam management configuration may include a repetition indication that indicates that a plurality of SRSs are to be transmitted on a single beam. The at least one DMRS may be transmitted on the single beam based at least in part on the repetition indication.

As indicated above, FIG. 3 is provided as an example. Other examples may differ from what is described with respect to FIG. 3.

Figure 4:
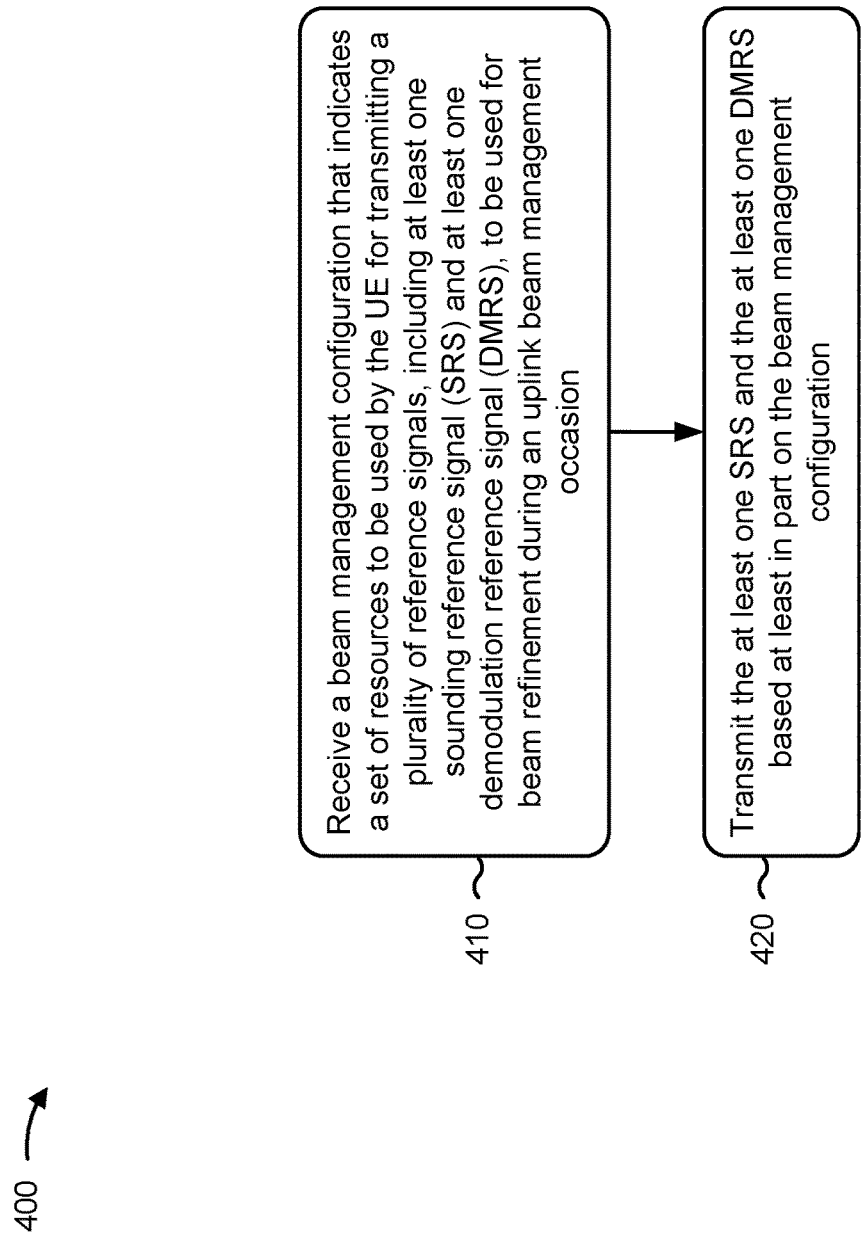
FIG. 4 is a diagram illustrating an example process performed, for example, by a user equipment, in accordance with the present disclosure.

FIG. 4 is a diagram illustrating an example process 400 performed, for example, by a UE, in accordance with the present disclosure. Example process 400 is an example where the UE (e.g., UE 120 and/or the like) performs operations associated with mixed uplink reference signal beam management.

As shown in FIG. 4, in some aspects, process 400 may include receiving, from a base station, a beam management configuration that indicates a set of resources to be used by the UE for transmitting a plurality of reference signals, including at least one SRS and at least one DMRS, to be used for beam refinement during an uplink beam management occasion (block 410). For example, the UE (e.g., using receive processor 258, controller/processor 280, memory 282, and/or the like) may receive, from a base station, a beam management configuration that indicates a set of resources to be used by the UE for transmitting a plurality of reference signals, including at least one SRS and at least one DMRS, to be used for beam refinement during an uplink beam management occasion, as described above.

As further shown in FIG. 4, in some aspects, process 400 may include transmitting, to the base station, the at least one SRS and the at least one DMRS based at least in part on the beam management configuration (block 420). For example, the UE (e.g., using transmit processor 264, controller/processor 280, memory 282, and/or the like) may transmit, to the base station, the at least one SRS and the at least one DMRS based at least in part on the beam management configuration, as described above.

Process 400 may include additional aspects, such as any single aspect or any combination of aspects described below and/or in connection with one or more other processes described elsewhere herein.

In a first aspect, the at least one DMRS is transmitted on a PUCCH.

In a second aspect, alone or in combination with the first aspect, the at least one DMRS is transmitted on a PUSCH.

In a third aspect, alone or in combination with one or more of the first and second aspects, the beam management configuration is carried in an RRC message.

In a fourth aspect, alone or in combination with one or more of the first through third aspects, the set of resources comprises at least one of a set of periodic SRS resources, a set of semi-persistent SRS resources, or a combination thereof.

In a fifth aspect, alone or in combination with one or more of the first through fourth aspects, the set of resources comprises at least one of a set of DMRS resources corresponding to a PUCCH, a set of DMRS resources corresponding to a CG configuration, or a combination thereof.

In a sixth aspect, alone or in combination with one or more of the first through fifth aspects, the beam management configuration is carried in DCI.

In a seventh aspect, alone or in combination with one or more of the first through sixth aspects, the set of resources comprises at least one of a set of periodic SRS resources, a set of semi-persistent SRS resources, a set of aperiodic SRS resources, or a combination thereof.

In an eighth aspect, alone or in combination with one or more of the first through seventh aspects, the set of resources comprises a set of DMRS resources corresponding to one or more PUSCH grants.

In a ninth aspect, alone or in combination with one or more of the first through eighth aspects, the at least one DMRS comprises a plurality of DMRSs.

In a tenth aspect, alone or in combination with the ninth aspect, the plurality of DMRSs are based at least in part on at least one of a repeated uplink transmission, a plurality of uplink resource grants, or a combination thereof.

In an eleventh aspect, alone or in combination with one or more of the first through tenth aspects, process 400 includes receiving a beam management trigger indication, wherein the at least one SRS and the at least one DMRS are transmitted for beam management based at least in part on receiving the beam management trigger indication.

In a twelfth aspect, alone or in combination with the eleventh aspect, the beam management trigger indication is carried in an RRC message or DCI.

In a thirteenth aspect, alone or in combination with one or more of the first through twelfth aspects, the set of resources comprises a set of time-domain resources indicating a window corresponding to the uplink beam management occasion.

In a fourteenth aspect, alone or in combination with the thirteenth aspect, the window is associated with a time period to begin before a resource grant, after a resource grant, before a CG occasion, after a CG occasion, before a PUCCH transmission, after a PUCCH transmission, before a DCI trigger, or after a DCI trigger.

In a fifteenth aspect, alone or in combination with one or more of the first through fourteenth aspects, the beam management configuration comprises downlink control information comprising an explicit indication of at least one of the at least one SRS, the at least one DMRS, or a combination thereof.

In a sixteenth aspect, alone or in combination with one or more of the first through fifteenth aspects, the at least one SRS and the at least one DMRS are transmitted using a single beam.

In a seventeenth aspect, alone or in combination with one or more of the first through sixteenth aspects, the at least one SRS and the at least one DMRS permit the base station to facilitate refinement of one or more receiving beams associated with the base station.

In an eighteenth aspect, alone or in combination with one or more of the first through seventeenth aspects, the process 400 includes receiving, from the base station, a request for the UE to transmit the at least one SRS and the at least one DMRS using a single beam, wherein the request is carried in downlink control information.

In a nineteenth aspect, alone or in combination with one or more of the first through eighteenth aspects, the beam management configuration comprises a repetition indication that indicates that a plurality of SRSs are to be transmitted on a single beam.

In a twentieth aspect, alone or in combination with the nineteenth aspect, the at least one DMRS is transmitted on the single beam based at least in part on the repetition indication.

In a twenty-first aspect, alone or in combination with one or more of the first through twentieth aspects, the plurality of reference signals are transmitted using a plurality of beams.

In a twenty-second aspect, alone or in combination with one or more of the first through twenty-first aspects, the UE is to use the at least one SRS and the at least one DMRS to facilitate refinement of one or more transmitting beams associated with the UE.

In a twenty-third aspect, alone or in combination with one or more of the first through twenty-second aspects, process 400 includes receiving, from the base station, an SRI configuration corresponding to an SRI that includes at least one identifier associated with the at least one DMRS.

In a twenty-fourth aspect, alone or in combination with the twenty-third aspect, the SRI configuration is carried in an RRC message or DCI.

In a twenty-fifth aspect, alone or in combination with one or more of the twenty-third through twenty-fourth aspects, the process 400 includes receiving the SRI, wherein the SRI indicates a selected beam, and wherein the selected beam is selected by the base station based at least in part on a signal quality associated with the selected beam.

In a twenty-sixth aspect, alone or in combination with the twenty-fifth aspect, the SRI indicates the selected beam using the at least one index associated with the at least one DMRS.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
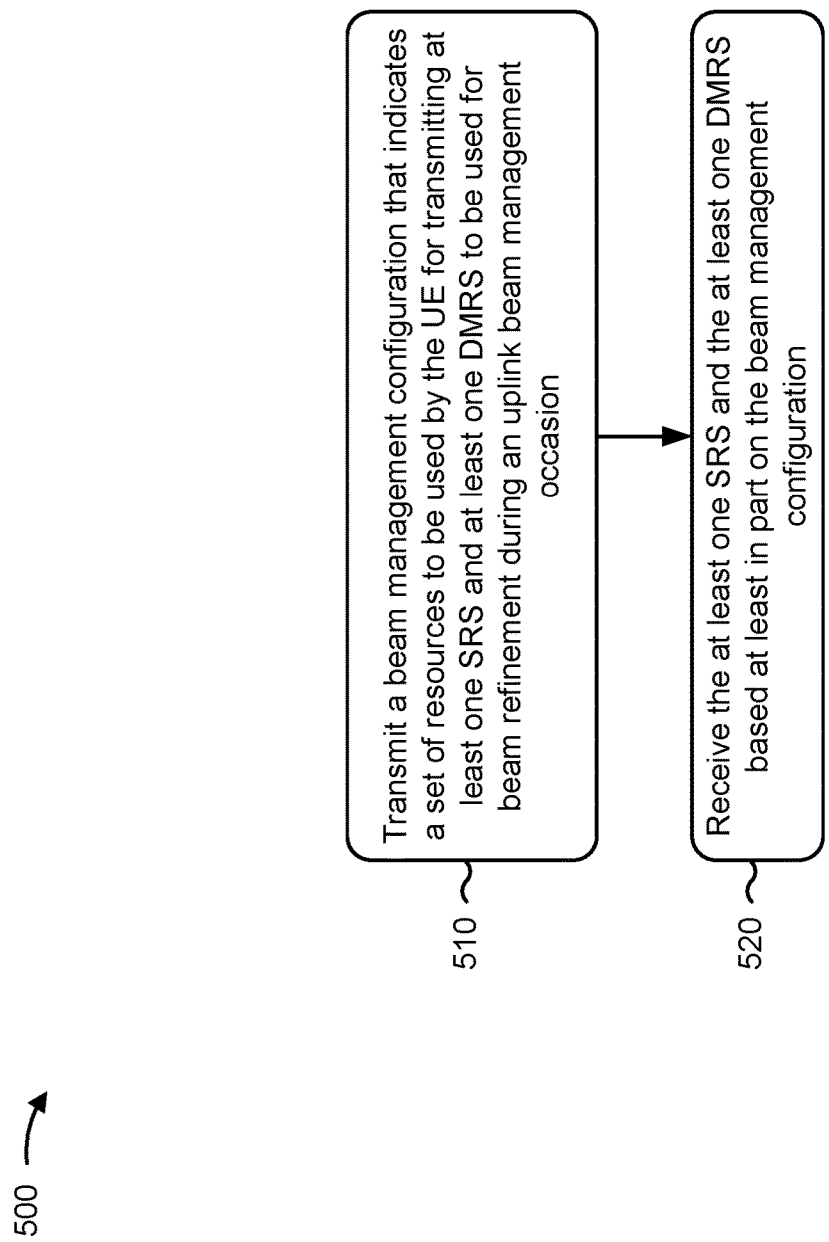
FIG. 5 is a diagram illustrating an example process performed, for example, by a base station, in accordance with the present disclosure.

FIG. 5 is a diagram illustrating an example process 500 performed, for example, by a base station, in accordance with the present disclosure. Example process 500 is an example where the base station (e.g., base station 110 and/or the like) performs operations associated with mixed uplink reference signal beam management.

As shown in FIG. 5, in some aspects, process 500 may include transmitting, to a UE, a beam management configuration that indicates a set of resources to be used by the UE for transmitting at least one SRS and at least one DMRS to be used for beam refinement during an uplink beam management occasion (block 510). For example, the base station (e.g., using transmit processor 220, controller/processor 240, memory 242, and/or the like) may transmit, to a UE, a beam management configuration that indicates a set of resources to be used by the UE for transmitting at least one SRS and at least one DMRS to be used for beam refinement during an uplink beam management occasion, as described above.

As further shown in FIG. 5, in some aspects, process 500 may include receiving, from the UE, the at least one SRS and the at least one DMRS based at least in part on the beam management configuration (block 520). For example, the base station (e.g., using receive processor 238, controller/ processor 240, memory 242, and/or the like) may receive, from the UE, the at least one SRS and the at least one DMRS based at least in part on the beam management configuration, as described above.

Process 500 may include additional aspects, such as any single aspect or any combination of aspects described below and/or in connection with one or more other processes described elsewhere herein.

In a first aspect, the at least one DMRS is transmitted on a PUCCH.

In a second aspect, alone or in combination with the first aspect, the at least one DMRS is transmitted on a PUSCH.

In a third aspect, alone or in combination with one or more of the first and second aspects, the beam management configuration is carried in an RRC message.

In a fourth aspect, alone or in combination with one or more of the first through third aspects, the set of resources comprises at least one of a set of periodic SRS resources, a set of semi-persistent SRS resources, or a combination thereof.

In a fifth aspect, alone or in combination with one or more of the first through fourth aspects, the set of resources comprises at least one of a set of DMRS resources corresponding to a PUCCH, a set of DMRS resources corresponding to a CG configuration, or a combination thereof.

In a sixth aspect, alone or in combination with one or more of the first through fifth aspects, the beam management configuration is carried in DCI.

In a seventh aspect, alone or in combination with one or more of the first through sixth aspects, the set of resources comprises at least one of a set of periodic SRS resources, a set of semi-persistent SRS resources, a set of aperiodic SRS resources, or a combination thereof.

In an eighth aspect, alone or in combination with one or more of the first through seventh aspects, the set of resources comprises a set of DMRS resources corresponding to one or more PUSCH grants.

In a ninth aspect, alone or in combination with one or more of the first through eighth aspects, the at least one DMRS comprises a plurality of DMRSs.

In a tenth aspect, alone or in combination with the ninth aspect, the plurality of DMRSs are based at least in part on at least one of a repeated uplink transmission, a plurality of uplink resource grants, or a combination thereof.

In an eleventh aspect, alone or in combination with one or more of the first through tenth aspects, process 500 includes transmitting, to the UE, a beam management trigger indication, wherein the at least one SRS and the at least one DMRS are transmitted for beam management based at least in part on the UE receiving the beam management trigger indication.

In a twelfth aspect, alone or in combination with the eleventh aspect, the beam management trigger indication is carried in an RRC message or DCI.

In a thirteenth aspect, alone or in combination with one or more of the first through twelfth aspects, the set of resources comprises a set of time-domain resources indicating a window corresponding to the uplink beam management occasion.

In a fourteenth aspect, alone or in combination with the thirteenth aspect, the window is associated with a time period to begin before a resource grant, after a resource grant, before a CG occasion, after a CG occasion, before a PUCCH transmission, after a PUCCH transmission, before a DCI trigger, or after a DCI trigger.

In a fifteenth aspect, alone or in combination with one or more of the first through fourteenth aspects, the beam management configuration comprises DCI comprising an explicit indication of at least one of the at least one SRS, the at least one DMRS, or a combination thereof.

In a sixteenth aspect, alone or in combination with one or more of the first through fifteenth aspects, the at least one SRS and the at least one DMRS are transmitted using a single beam.

In a seventeenth aspect, alone or in combination with one or more of the first through sixteenth aspects, the at least one SRS and the at least one DMRS permit the base station to facilitate refinement of one or more receiving beams associated with the base station.

In an eighteenth aspect, alone or in combination with one or more of the first through seventeenth aspects, the process 500 includes transmitting, to the UE, a request for the UE to transmit the at least one SRS and the at least one DMRS using a single beam, wherein the request is carried in DCI.

In a nineteenth aspect, alone or in combination with one or more of the first through eighteenth aspects, the beam management configuration comprises a repetition indication that indicates that a plurality of SRSs are to be transmitted on a single beam.

In a twentieth aspect, alone or in combination with the nineteenth aspect, the at least one DMRS is transmitted on the single beam based at least in part on the repetition indication.

In a twenty-first aspect, alone or in combination with one or more of the first through twentieth aspects, the plurality of reference signals are transmitted using a plurality of beams.

In a twenty-second aspect, alone or in combination with one or more of the first through twenty-first aspects, the UE is to use the at least one SRS and the at least one DMRS to facilitate refinement of one or more transmitting beams associated with the UE.

In a twenty-third aspect, alone or in combination with one or more of the first through twenty-second aspects, process 500 includes transmitting, to the UE, an SRI configuration corresponding to an SRI that includes at least one identifier associated with the at least one DMRS.

In a twenty-fourth aspect, alone or in combination with the twenty-third aspect, the SRI configuration is carried in an RRC message or DCI.

In a twenty-fifth aspect, alone or in combination with one or more of the twenty-third through twenty-fourth aspects, the process 500 includes transmitting the SRI, wherein the SRI indicates a selected beam, and wherein the selected beam is selected by the base station based at least in part on a signal quality associated with the selected beam.

In a twenty-sixth aspect, alone or in combination with the twenty-fifth aspect, the SRI indicates the selected beam using the at least one index associated with the at least one DMRS.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method of wireless communication performed by a user equipment (UE), comprising: receiving, from a base station, a beam management configuration that indicates a set of resources to be used by the UE for transmitting a plurality of reference signals, including at least one sounding reference signal (SRS) and at least one demodulation reference signal (DMRS), to be used for beam refinement during an uplink beam management occasion; and transmitting, to the base station, the at least one SRS and the at least one DMRS based at least in part on the beam management configuration.

Aspect 2: The method of Aspect 1, wherein the at least one DMRS is transmitted on a physical uplink control channel.

Aspect 3: The method of either of Aspects 1 or 2, wherein the at least one DMRS is transmitted on a physical uplink shared channel.

Aspect 4: The method of any of Aspects 1-3, wherein the beam management configuration is carried in a radio resource control message.

Aspect 5: The method of any of Aspects 1-4, wherein the set of resources comprises at least one of a set of periodic SRS resources, a set of semi-persistent SRS resources, or a combination thereof.

Aspect 6: The method of any of Aspects 1-5, wherein the set of resources comprises at least one of a set of DMRS resources corresponding to a physical uplink control channel, a set of DMRS resources corresponding to a configured grant configuration, or a combination thereof.

Aspect 7: The method of any of Aspects 1-6, wherein the beam management configuration is carried in downlink control information.

Aspect 8: The method of any of Aspects 1-7, wherein the set of resources comprises at least one of a set of periodic SRS resources, a set of semi-persistent SRS resources, a set of aperiodic SRS resources, or a combination thereof.

Aspect 9: The method of any of Aspects 1-8, wherein the set of resources comprises a set of DMRS resources corresponding to one or more physical uplink shared channel grants.

Aspect 10: The method of any of Aspects 1-9, wherein the at least one DMRS comprises a plurality of DMRSs.

Aspect 11: The method of Aspect 10, wherein the plurality of DMRSs are based at least in part on at least one of a repeated uplink transmission, a plurality of uplink resource grants, or a combination thereof.

Aspect 12: The method of any of Aspects 1-11, further comprising: receiving a beam management trigger indication, wherein the at least one SRS and the at least one DMRS are transmitted for beam management based at least in part on receiving the beam management trigger indication.

Aspect 13: The method of Aspect 12, wherein the beam management trigger indication is carried in a radio resource control message or downlink control information.

Aspect 14: The method of any of Aspects 1-13, wherein the set of resources comprises a set of time-domain resources indicating a window corresponding to the uplink beam management occasion.

Aspect 15: The method of Aspect 14, wherein the window is associated with a time period to begin before a resource grant, after a resource grant, before a configured grant (CG) occasion, after a CG occasion, before a physical uplink control channel (PUCCH) transmission, after a PUCCH transmission, before a downlink control information (DCI) trigger, or after a DCI trigger.

Aspect 16: The method of any of Aspects 1-15, wherein the beam management configuration comprises downlink control information comprising an explicit indication of at least one of the at least one SRS, the at least one DMRS, or a combination thereof.

Aspect 17: The method of any of Aspects 1-16, wherein the at least one SRS and the at least one DMRS are transmitted using a single beam.

Aspect 18: The method of any of Aspects 1-17, wherein the at least one SRS and the at least one DMRS permit the base station to facilitate refinement of one or more receiving beams associated with the base station.

Aspect 19: The method of any of Aspects 1-18, further comprising receiving, from the base station, a request for the UE to transmit the at least one SRS and the at least one DMRS using a single beam, wherein the request is carried in downlink control information.

Aspect 20: The method of any of Aspects 1-19, wherein the beam management configuration comprises a repetition indication that indicates that a plurality of SRSs are to be transmitted on a single beam.

Aspect 21: The method of Aspect 20, wherein the at least one DMRS is transmitted on the single beam based at least in part on the repetition indication.

Aspect 22: The method of any of Aspects 1-21, wherein the plurality of reference signals are transmitted using a plurality of beams.

Aspect 23: The method of any of Aspects 1-22, wherein the UE is to use the at least one SRS and the at least one DMRS to facilitate refinement of one or more transmitting beams associated with the UE.

Aspect 24: The method of any of Aspects 1-23, further comprising receiving, from the base station, an SRS resource indicator (SRI) configuration corresponding to an SRI that includes at least one identifier associated with the at least one DMRS.

Aspect 25: The method of Aspect 24, wherein the SRI configuration is carried in a radio resource configuration message or downlink control information.

Aspect 26: The method of either of Aspects 24 or 25, further comprising receiving the SRI, wherein the SRI indicates a selected beam, wherein the selected beam is selected by the base station based at least in part on a signal quality associated with the selected beam.

Aspect 27: The method of Aspect 26, wherein the SRI indicates the selected beam using at least one index associated with the at least one DMRS.

Aspect 28: A method of wireless communication performed by a base station, comprising: transmitting, to a user equipment (UE), a beam management configuration that indicates a set of resources to be used by the UE for transmitting at least one sounding reference signal (SRS) and at least one demodulation reference signal (DMRS) to be used for beam refinement during an uplink beam management occasion; and receiving, from the UE, the at least one SRS and the at least one DMRS based at least in part on the beam management configuration.

Aspect 29: The method of Aspect 28, wherein the at least one DMRS is transmitted on a physical uplink control channel.

Aspect 30: The method of either of Aspects 28 or 29, wherein the at least one DMRS is transmitted on a physical uplink shared channel.

Aspect 31: The method of any of Aspects 28-30, wherein the beam management configuration is carried in a radio resource control message.

Aspect 32: The method of any of Aspects 28-31, wherein the set of resources comprises at least one of a set of periodic SRS resources, a set of semi-persistent SRS resources, or a combination thereof.

Aspect 33: The method of any of Aspects 28-32, wherein the set of resources comprises at least one of a set of DMRS resources corresponding to a physical uplink control channel, a set of DMRS resources corresponding to a configured grant configuration, or a combination thereof.

Aspect 34: The method of any of Aspects 28-33, wherein the beam management configuration is carried in downlink control information.

Aspect 35: The method of any of Aspects 28-34, wherein the set of resources comprises at least one of a set of periodic SRS resources, a set of semi-persistent SRS resources, a set of aperiodic SRS resources, or a combination thereof.

Aspect 36: The method of any of Aspects 28-35, wherein the set of resources comprises a set of DMRS resources corresponding to one or more physical uplink shared channel grants.

Aspect 37: The method of any of Aspects 28-36, wherein the at least one DMRS comprises a plurality of DMRSs.

Aspect 38: The method of Aspect 37, wherein the plurality of DMRSs are based at least in part on at least one of a repeated uplink transmission, a plurality of uplink resource grants, or a combination thereof.

Aspect 39: The method of any of Aspects 28-38, further comprising: transmitting, to the UE, a beam management trigger indication, wherein the at least one SRS and the at least one DMRS are transmitted for beam management based at least in part on the UE receiving the beam management trigger indication.

Aspect 40: The method of Aspect 39, wherein the beam management trigger indication is carried in a radio resource control message or downlink control information.

Aspect 41: The method of any of Aspects 28-40, wherein the set of resources comprises a set of time-domain resources indicating a window corresponding to the uplink beam management occasion.

Aspect 42: The method of Aspect 41, wherein the window is associated with a time period to begin before a resource grant, after a resource grant, before a configured grant (CG) occasion, after a CG occasion, before a physical uplink control channel (PUCCH) transmission, after a PUCCH transmission, before a downlink control information (DCI) trigger, or after a DCI trigger.

Aspect 43: The method of any of Aspects 28-42, wherein the beam management configuration comprises downlink control information comprising an explicit indication of at least one of the at least one SRS, the at least one DMRS, or a combination thereof.

Aspect 44: The method of any of Aspects 28-43, wherein the at least one SRS and the at least one DMRS are transmitted using a single beam.

Aspect 45: The method of any of Aspects 28-44, wherein the at least one SRS and the at least one DMRS permit the base station to facilitate refinement of one or more receiving beams associated with the base station.

Aspect 46: The method of any of Aspects 28-45, further comprising transmitting, to the UE, a request for the UE to transmit the at least one SRS and the at least one DMRS using a single beam, wherein the request is carried in downlink control information.

Aspect 47: The method of any of Aspects 28-46, wherein the beam management configuration comprises a repetition indication that indicates that a plurality of SRSs are to be transmitted on a single beam.

Aspect 48: The method of Aspect 47, wherein the at least one DMRS is transmitted on the single beam based at least in part on the repetition indication.

Aspect 49: The method of any of Aspects 28-48, wherein the at least one SRS and the at least one DMRS are transmitted using a plurality of beams.

Aspect 50: The method of any of Aspects 28-49, wherein the UE is to use the at least one SRS and the at least one DMRS to facilitate refinement of one or more transmitting beams associated with the UE.

Aspect 51: The method of any of Aspects 28-50, further comprising transmitting, to the UE, an SRS resource indicator (SRI) configuration corresponding to an SRI that includes at least one identifier associated with the at least one DMRS.

Aspect 52: The method of Aspect 51, wherein the SRI configuration is carried in a radio resource configuration message or downlink control information.

Aspect 53: The method of either of Aspects 51 or 52, further comprising transmitting the SRI, wherein the SRI indicates a selected beam, wherein the selected beam is selected by the base station based at least in part on a signal quality associated with the selected beam.

Aspect 54: The method of Aspect 53, wherein the SRI indicates the selected beam using at least one index associated with the at least one DMRS.

Aspect 55: An apparatus for wireless communication at a device, comprising a processor; memory coupled with the processor; and instructions stored in the memory and executable by the processor to cause the apparatus to perform the method of one or more Aspects of Aspects 1-27.

Aspect 56: A device for wireless communication, comprising a memory and one or more processors coupled to the memory, the memory and the one or more processors configured to perform the method of one or more Aspects of Aspects 1-27.

Aspect 57: An apparatus for wireless communication, comprising at least one means for performing the method of one or more Aspects of Aspects 1-27.

Aspect 58: A non-transitory computer-readable medium storing code for wireless communication, the code comprising instructions executable by a processor to perform the method of one or more Aspects of Aspects 1-27.

Aspect 59: A non-transitory computer-readable medium storing a set of instructions for wireless communication, the set of instructions comprising one or more instructions that, when executed by one or more processors of a device, cause the device to perform the method of one or more Aspects of Aspects 1-27.

Aspect 60: An apparatus for wireless communication at a device, comprising a processor; memory coupled with the processor; and instructions stored in the memory and executable by the processor to cause the apparatus to perform the method of one or more Aspects of Aspects 28-54.

Aspect 61: A device for wireless communication, comprising a memory and one or more processors coupled to the memory, the memory and the one or more processors configured to perform the method of one or more Aspects of Aspects 28-54.

Aspect 62: An apparatus for wireless communication, comprising at least one means for performing the method of one or more Aspects of Aspects 28-54.

Aspect 63: A non-transitory computer-readable medium storing code for wireless communication, the code comprising instructions executable by a processor to perform the method of one or more Aspects of Aspects 28-54.

Aspect 64: A non-transitory computer-readable medium storing a set of instructions for wireless communication, the set of instructions comprising one or more instructions that, when executed by one or more processors of a device, cause the device to perform the method of one or more Aspects of Aspects 28-54.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   memory; and
   one or more processors, coupled to the memory, configured to:
      receive, from a network entity, a beam management configuration that indicates a set of resources that include a combination of:
         a set of sounding reference signal (SRS) resources, and
         a set of demodulation reference signal (DMRS) resources,
      wherein the beam management configuration comprises a repetition indication that indicates that a plurality of SRSs are to be transmitted on a single beam; and
      transmit, to the network entity and during an uplink beam management occasion, a plurality of reference signals including at least one SRS and at least one DMRS using the set of resources indicated by the beam management configuration,
      wherein the at least one DMRS is transmitted on the single beam based at least in part on the repetition indication.

2. The UE of claim 1, wherein the at least one DMRS is transmitted on at least one of a physical uplink control channel or a physical uplink shared channel.

3. The UE of claim 1, wherein the beam management configuration is carried in a radio resource control message, and wherein the set of resources comprises at least one of a set of periodic SRS resources or a set of semi-persistent SRS resources.

4. The UE of claim 1, wherein the beam management configuration is carried in a radio resource control message, and wherein the set of resources comprises at least one of a set of DMRS resources corresponding to a physical uplink control channel, a set of DMRS resources corresponding to a configured grant configuration, or a combination thereof.

5. The UE of claim 1, wherein the beam management configuration is carried in downlink control information, and wherein the set of resources comprises at least one of a set of periodic SRS resources, a set of semi-persistent SRS resources, a set of aperiodic SRS resources, or a combination thereof.

6. The UE of claim 1, wherein the beam management configuration is carried in downlink control information, and wherein the set of resources comprises a set of DMRS resources corresponding to one or more physical uplink shared channel grants.

7. The UE of claim 1, wherein the at least one DMRS comprises a plurality of DMRSs, and wherein the plurality of DMRSs are based at least in part on at least one of a repeated uplink transmission, a plurality of uplink resource grants, or a combination thereof.

8. The UE of claim 1, wherein the one or more processors are further configured to:
   receive a beam management trigger indication,
      wherein the at least one SRS and the at least one DMRS are transmitted for beam management based at least in part on receiving the beam management trigger indication.

9. The UE of claim 1, wherein the set of resources indicates a window corresponding to the uplink beam management occasion.

10. The UE of claim 9, wherein the window is associated with a time period to begin before a resource grant, after a resource grant, before a configured grant (CG) occasion, after a CG occasion, before a physical uplink control channel (PUCCH) transmission, after a PUCCH transmission, before a downlink control information (DCI) trigger, or after a DCI trigger.

11. The UE of claim 1, wherein the beam management configuration comprises downlink control information comprising an explicit indication of at least one of the at least one SRS, the at least one DMRS, or a combination thereof.

12. The UE of claim 1, wherein the at least one SRS and the at least one DMRS are transmitted using the single beam.

13. The UE of claim 1, wherein the one or more processors are further configured to receive, from the network entity, a request for the UE to transmit the at least one SRS and the at least one DMRS using the single beam, wherein the request is carried in downlink control information.

14. The UE of claim 1, wherein the plurality of reference signals are transmitted using a plurality of beams.

15. The UE of claim 1, wherein the one or more processors are further configured to transmit the at least one SRS and the at least one DMRS to facilitate refinement of one or more transmitting beams associated with the UE.

16. The UE of claim 1, wherein the one or more processors are further configured to receive, from the network entity, an SRS resource indicator (SRI) configuration corresponding to an SRI that includes at least one identifier associated with the at least one DMRS.

17. The UE of claim 1, wherein the one or more processors are further configured to receive an SRS resource indicator (SRI) that indicates a selected beam using an index of a DMRS.

18. A network entity for wireless communication, comprising:
  memory; and
  one or more processors, coupled to the memory, configured to:
    transmit, for a user equipment (UE), a beam management configuration that indicates a set of resources that include a combination of:
      a set of sounding reference signal (SRS) resources, and
      a set of demodulation reference signal (DMRS) resources,
    wherein the beam management configuration comprises a repetition indication that indicates that a plurality of SRSs are to be transmitted on a single beam; and
    receive, during an uplink beam management occasion, at least one SRS and at least one DMRS using the set of resources indicated by the beam management configuration,
    wherein the at least one DMRS is communicated via the single beam based at least in part on the repetition indication.

19. The network entity of claim 18, wherein the set of resources comprises at least one of a set of DMRS resources corresponding to a physical uplink control channel, a set of DMRS resources corresponding to a configured grant configuration, a set of DMRS resources corresponding to one or more physical uplink shared channel grants, a set of periodic SRS resources, a set of semi-persistent SRS resources, or a set of aperiodic SRS resources.

20. The network entity of claim 18, wherein the one or more processors are further configured to:
  transmit, to the UE, a beam management trigger indication,
  wherein the at least one SRS and the at least one DMRS are transmitted for beam management based at least in part on the UE receiving the beam management trigger indication.

21. The network entity of claim 20, wherein the set of resources indicates a window corresponding to the uplink beam management occasion, and wherein the window is associated with a time period to begin before a resource grant, after a resource grant, before a configured grant (CG) occasion, after a CG occasion, before a physical uplink control channel (PUCCH) transmission, after a PUCCH transmission, before a downlink control information (DCI) trigger, or after a DCI trigger.

22. The network entity of claim 18, wherein the beam management configuration comprises downlink control information comprising an explicit indication of at least one of the at least one SRS, the at least one DMRS, or a combination thereof.

23. The network entity of claim 18, wherein the one or more processors are further configured to transmit, to the UE, a request for the UE to transmit the at least one SRS and the at least one DMRS using the single beam, wherein the request is carried in downlink control information.

24. The network entity of claim 18, wherein the one or more processors are further configured to transmit, to the UE, an SRS resource indicator (SRI) configuration corresponding to an SRI that includes at least one identifier associated with the at least one DMRS.

25. The network entity of claim 18, wherein the one or more processors are further configured to transmit an SRS resource indicator (SRI) that indicates a selected beam using an index of a DMRS.

26. A method of wireless communication performed by a user equipment (UE), comprising:
  receiving, from a network entity, a beam management configuration that indicates a set of resources that include a combination of:
    a set of sounding reference signal (SRS) resources, and
    a set of demodulation reference signal (DMRS) resources,
  wherein the beam management configuration comprises a repetition indication that indicates that a plurality of SRSs are to be transmitted on a single beam; and
  transmitting, to the network entity and during an uplink beam management occasion, at least one SRS and at least one DMRS using the set of resources indicated by the beam management configuration,
  wherein the at least one DMRS is transmitted on the single beam based at least in part on the repetition indication.

27. The method of claim 26, wherein the at least one SRS and the at least one DMRS are transmitted using the single beam.

28. The method of claim 26, further comprising:
  receiving, from the network entity, a request for the UE to transmit the at least one SRS and the at least one DMRS using the single beam, wherein the request is carried in downlink control information.

29. A method of wireless communication performed by a network entity, comprising:
  transmitting, for a user equipment (UE), a beam management configuration that indicates a set of resources that include a combination of:
    a set of sounding reference signal (SRS) resources, and
    a set of demodulation reference signal (DMRS) resources, wherein the beam management configuration comprises a repetition indication that indicates that a plurality of SRSs are to be transmitted on a single beam; and receiving, during an uplink beam management occasion, at least one SRS and at least one DMRS using the set of resources indicated by the beam management configuration, wherein the at least one DMRS is communicated via the single beam based at least in part on the repetition indication.

30. The method of claim 29, wherein the at least one SRS and the at least one DMRS are transmitted using the single beam.

* * * * *